UNITED STATES PATENT OFFICE.

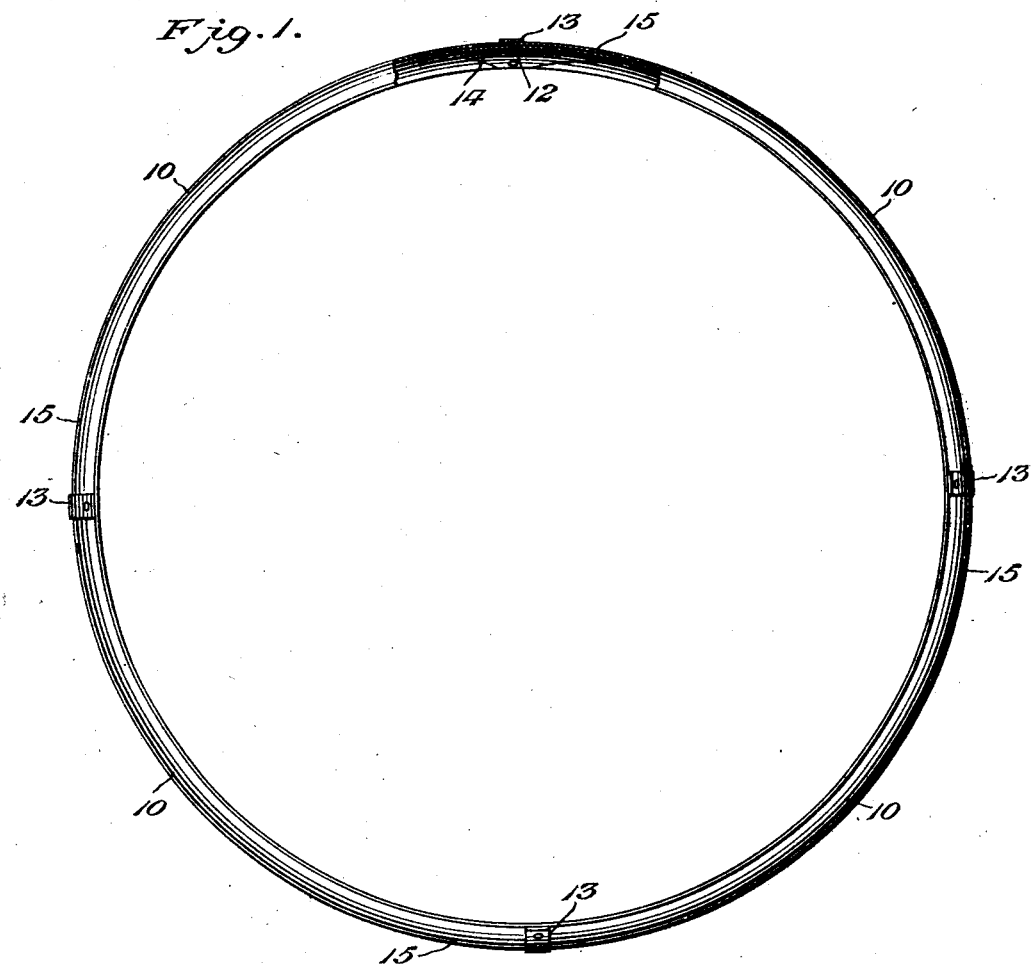
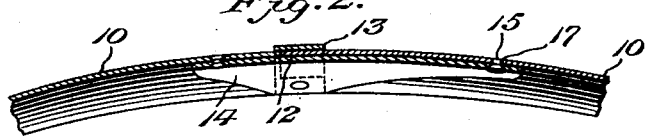
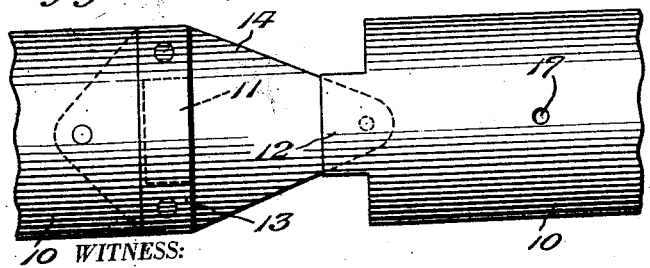
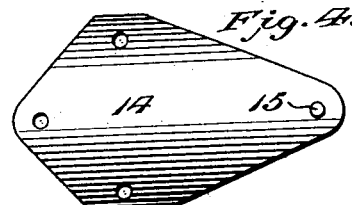

JOHN J. ROUSE, OF LA CROSSE, WISCONSIN.

TIRE PROTECTOR.

1,409,031.

Specification of Letters Patent.   Patented Mar. 7, 1922.

Application filed August 2, 1919.   Serial No. 314,865.

*To all whom it may concern:*

Be it known that I, JOHN J. ROUSE, residing at La Crosse, in the county of La Crosse and State of Wisconsin, have invented new and useful Improvements in Tire Protectors, of which the following is a specification.

This invention comprehends the provision of a tire protector in the nature of a metallic band designed for use between a shoe and pneumatic tube of a tire, to prevent puncture of the latter. The invention resides in the specific construction and arrangement of parts as claimed.

In the drawing forming part of this specification like numerals of reference indicate similar parts in the several views and wherein:—

Figure 1 is a view of the band forming the subject matter of the invention.

Figure 2 is a transverse sectional view to the joint between the adjacent sections of the band.

Figure 3 is a fragmentary view showing the adjacent ends of the respective sections separated.

Figure 4 is a detail view of the plate which bridges the joint.

The tire protector forming the subject matter of my invention consists of a metallic band of metal or other suitable material, sufficiently flexible to conform to the curvature of the tire with which it is used. The band is herein indicated at 10, and is adapted to be arranged within the shoe and the pneumatic tube of the tire. The band is made up of a plurality of sections which have their adjacent extremities suitably connected together. One end of each section is cut away as at 11, while the opposite end of each section is formed with a tongue 12. Arranged transversely of each section is a strip 13 which is secured to one side of the section bridging the cut away portion 13. Arranged at the opposite side of each section is a substantially triangular shaped plate 14, suitable fastening elements such as rivets or the like securing said parts together. It will be noted that the cut away portion 11 together with the strip 13 and plate 14 defines a groove in which the tongue 12 is adapted to be received when the sections are operatively associated. The plate 14 projects an appreciable distance beyond the meeting ends of the respective section, and carries a short stud 15 which is adapted to be received within an oblong opening 17 in the section of the band with which it is engaged. In this manner the sections are held fixed relatively. Any number of sections may be employed in the make up of the band, and it is to be understood that the latter can vary in size for use in conjunction with different size tires. The protector is provided with a canvas lining.

Mainfestly, I have shown a device, which when associated with a tire will prevent puncture of the inner tube and while I consider the disclosure the preferred embodiment of the invention I desire to have it understood that I do not limit myself in this conection in that such changes may be resorted to when desired as fall within the scope of what is claimed.

What I claim is:—

1. A tire protector comprising a sectional band adapted to be arranged between the shoe and pneumatic tube of the tire, a tongue and groove connection between the adjacent ends of the respective sections, a plate secured to each section and bridging the joint between the respective sections, one of said sections having an opening, and a stud carried by the plate to be received within said opening.

2. A tire protector comprising a sectional band adapted to be arranged between the shoe and pneumatic tube of the tire, one end of each section being cut away, a strip bridging said cut away portion, a plate secured to said section and projecting beyond said cut away portion, and defining a groove therewith and said strip, a tongue formed on the opposite end of said section and adapted to be received within the groove and the adjacent section, and means for connecting said plate of one section with the adjacent section of the band.

3. A tire protector comprising a sectional band adapted to be arranged within the shoe of a pneumatic tire, one end of each section being cut away, a strip bridging said cut away portion, a plate secured to said section and projecting beyond said cut away portion and defining a groove therewith and with the strip, a tongue formed on the opposite end of the section and adapted to be received within the groove and adjacent section, one of said sections having an opening and a stud carried by the plate to be received within said opening.

In testimony whereof I affix my signature.

JOHN J. ROUSE.